United States Patent
Mueller et al.

(10) Patent No.: US 10,309,342 B2
(45) Date of Patent: Jun. 4, 2019

(54) ACTUATOR CONTROL SYSTEM AND METHOD FOR GAS TURBINE ENGINE

(71) Applicant: Hamilton Sundstrand Corporation, Charlotte, NC (US)

(72) Inventors: Carl F. Mueller, Southington, CT (US); Leo J. Veilleux, Jr., Wethersfield, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 631 days.

(21) Appl. No.: 14/743,148

(22) Filed: Jun. 18, 2015

(65) Prior Publication Data

US 2016/0369745 A1    Dec. 22, 2016

(51) Int. Cl.
*F02K 1/76* (2006.01)
*F02C 9/00* (2006.01)

(52) U.S. Cl.
CPC .............. *F02K 1/76* (2013.01); *F02C 9/00* (2013.01); *F05D 2270/54* (2013.01); *F05D 2270/62* (2013.01); *Y02T 50/671* (2013.01)

(58) Field of Classification Search
CPC . F02K 1/76; F02C 9/00; Y02T 50/671; F05D 2270/62; F05D 2270/54
See application file for complete search history.

(56) References Cited

U.S. PATENT DOCUMENTS

| | | | |
|---|---|---|---|
| 5,960,626 A | 10/1999 | Baudu et al. | |
| 6,655,125 B2 | 12/2003 | Johnson et al. | |
| 2009/0292437 A1* | 11/2009 | Cloft | F01D 17/20 701/100 |
| 2010/0274416 A1* | 10/2010 | Poisson | B64D 31/14 701/3 |
| 2011/0048028 A1 | 3/2011 | Bader et al. | |
| 2012/0304666 A1 | 12/2012 | Maalioune | |
| 2013/0253735 A1* | 9/2013 | Roy | B64D 31/00 701/3 |

FOREIGN PATENT DOCUMENTS

| | | |
|---|---|---|
| CN | 102582838 A | 7/2012 |
| EP | 2128405 A2 | 12/2009 |
| EP | 2244148 A1 | 10/2010 |
| EP | 2644506 A2 | 10/2013 |
| WO | 2014051661 A1 | 4/2014 |

OTHER PUBLICATIONS

European Search Report for European Application No. 16175207.6 dated Nov. 16, 2016.

* cited by examiner

*Primary Examiner* — Jelani A Smith
*Assistant Examiner* — Majdi Alsomiri
(74) *Attorney, Agent, or Firm* — Carlson, Gaskey & Olds, P.C.

(57) ABSTRACT

A system for controlling actuators within a gas turbine engine according to an exemplary aspect of the present disclosure includes an electronic engine controller, a plurality of actuators, and a central control unit. The central control unit includes an actuator control unit electrically coupled to the electronic engine controller and a plurality of actuator control modules. Each of the actuator control modules is electrically coupled to each of the plurality of actuators. A method is also disclosed.

16 Claims, 1 Drawing Sheet

ACTUATOR CONTROL SYSTEM AND METHOD FOR GAS TURBINE ENGINE

BACKGROUND

Gas turbine engines are known to include a compressor section, a combustion section, and a turbine section. Generally, air is compressed in the compressor section, directed to the combustor section where it is combined with fuel and combusted, and then expanded in the turbine section. Various systems associated with the engine include independently controlled actuators. The actuators receive commands from an electronic engine controller (EEC). Some example systems include variable area nozzles, stator vane assemblies, and bleed valves, to name a few.

In some known engines, each actuator includes a linear variable differential transformer (LVDT) configured to provide actuator position information directly to the EEC. The actuators may further be fluidly coupled to a source of fuel, and incorporate a fuel-based hydraulic system (sometimes called a "fueldraulic" system).

Each actuator further includes separate, dedicated functions within each actuator for electric, fuel, and control. Each actuator is configured to interpret instructions from an engine control system and provide corresponding feedback.

SUMMARY

A system for controlling actuators within a gas turbine engine according to an exemplary aspect of the present disclosure includes an electronic engine controller, a plurality of actuators, and a central control unit. The central control unit includes an actuator control unit electrically coupled to the electronic engine controller and a plurality of actuator control modules. Each of the actuator control modules is electrically coupled to each of the plurality of actuators. A method is also disclosed and claimed.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
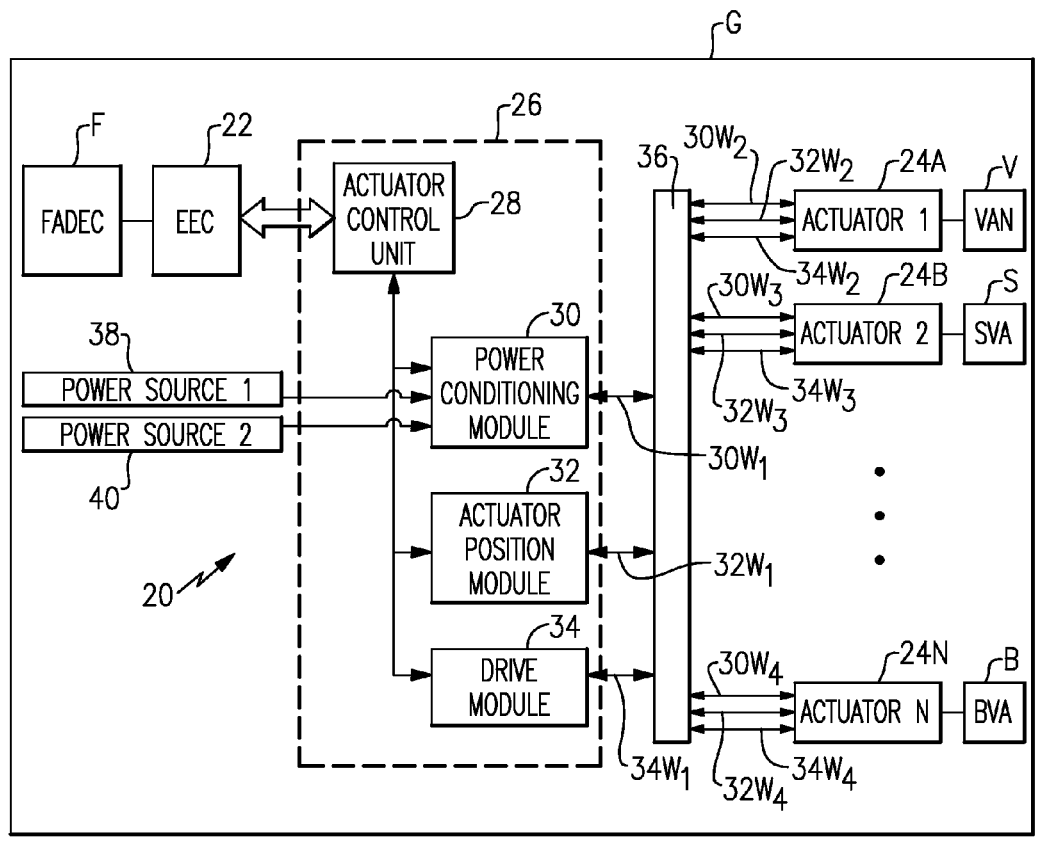
FIG. 1 schematically illustrates an example system according to this disclosure.

FIG. 1 illustrates an example actuator control system 20 ("system 20"). In this example, the system 20 generally includes an electronic engine controller (EEC) 22, a plurality of actuators 24A-24N, and a central control unit 26.

In one example, the EEC 22 is a digital computer included within a full authority digital engine controller (FADEC) F within a gas turbine engine G. The details of the gas turbine engine G are as known. In this example, the EEC 22 ultimately provides instructions to the central control unit 26, which is, in turn, capable of bringing about changes in the operating conditions of the actuators 24A-24N. It should be understood that the EEC 22 may be any known type of controller including memory, hardware, and software. The EEC 22 is configured to store instructions and to provide instructions to the various components of the system 20.

The actuators 24A-24N are illustrated schematically. In FIG. 1, only three actuators 24A, 24B, and 24N are illustrated. It should be understood that the system 20 could include a different number of actuators, each of which could be associated with a different system within a gas turbine engine. For example, the actuator 24A may be an actuator associated with a variable area nozzle V of the gas turbine engine G and configured to adjust a position of the flaps of the variable area nozzle to adjust the area of the nozzle of the engine G. The actuator 24B may be an actuator associated with a stator vane assembly S, and configured to adjust a position of one or more stator vanes within the engine G. The actuator 24N may be associated with a bleed valve assembly B, and configured to adjust the position of a bleed valve of the engine G.

The central control unit 26 includes an actuator control unit 28 which is electrically coupled directly to the EEC 22. The central control unit 26 further includes a plurality of actuator control modules 30, 32, 34, each of which is electrically coupled to each of the actuators 24A-24N. The central control unit 26, like the EEC 22, may be any known type of controller including memory, hardware, and software. In this example, the central control unit 26 is a separate unit (e.g., embodied on a separate computing device) from the EEC 22.

The central control unit 26 is configured to store instructions and to provide instructions to the various components of the system 20, namely the EEC 22 and the actuators 24A-24N. The actuator control unit 28 and each of the actuator control modules 30, 32, 34 may be software applications embodied on the central control unit 26 and/or include electrical components necessary to perform the function described herein.

In this example, the actuator control modules 30, 32, 34 include a power conditioning module 30, an actuator position module 32, and a drive module 34. Each of the actuator control modules 30, 32, 34 are electrically coupled to each of the plurality of actuators 24A-24N in parallel, by way of a bus 36. For instance, the power conditioning module 30 is electrically coupled directly to the bus 36 by at least one first wired connection $30W_1$, and is electrically coupled directly between the bus 36 and each of the actuators 24A-24N by individual wired connections $30W_2$-$30W_4$. The actuator position module 32 and the drive module 34 are also directly connected to the bus 36 (via wired connections $32W_1$, $34W_1$) and each of the actuators 24A-24N (via wired connections $32W_2$-$W_4$, $34W_2$-$W_4$). While wired connections are specifically contemplated herein, the connections could be wireless. Further, the bus 36 may be provided by wired connections using various protocols and signal types (e.g., microwaves).

The power conditioning module 30, the actuator position module 32, and the drive module 34 are each electrically coupled to the actuator control unit 28. Each of the modules 30, 32, 34 is configured to respond to commands from the actuator control unit 28, and to relay information to the actuator control unit 28 during operation. The actuator control unit 28 is configured to interpret commands from the EEC 22, and is further configured to relay information back to the EEC 22 from the modules 30, 32, 34 and the actuators 24A-24N.

The power conditioning module 30 includes a known type of power conditioner electrically coupled to at least one electrical power source. In this example, first and second power sources 38, 40 are coupled to the power conditioning module 30. The first power source 38 may be aircraft power (such as a generator located on the engine gearbox or shaft), and the second power source 40 may be another power source, such as Permanent Magnet Alternator (PMA) power. The power conditioning module 30 is configured to select an appropriate one of the power sources 38, 40, or to blend power from each source. The power conditioning module 30 is further configured to deliver conditioned electrical power to each of the plurality of actuators 24A-24N consistent with the instructions from the actuator control unit 28. The power conditioning module 30 provides steady, continuous power at correct levels to the actuators 24A-24N, and, in doing so, may perform functions such as filtering, converting, and switching.

Figure 2:
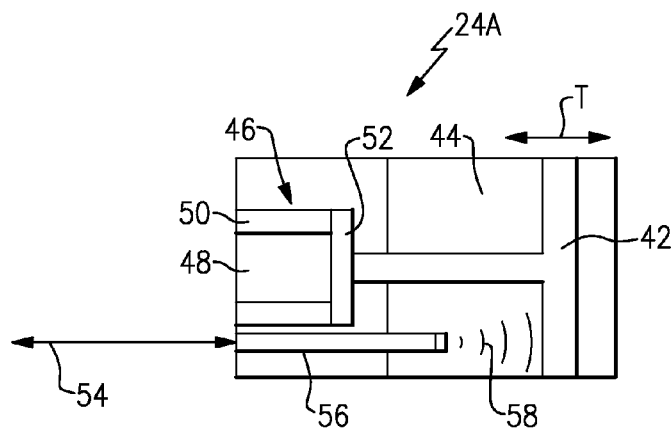
FIG. 2 schematically illustrates an example actuator.

The actuator position module 32 is configured to determine the position of each of the actuators 24A-24N. In FIG. 2, one of the actuators 24A is illustrated schematically. As illustrated, the actuator 24A includes a piston 42 moveable within a cylinder 44 in a generally forward and backward translation direction T. The piston 42 in this example is driven by a motor 46 having a rotor 48 and a stator 50. Rotation of the motor 46 is converted into translation of the piston 42 by way of a gearbox 52. The actuator 24A may also include a brake configured to maintain position of the piston 42. It should be understood that this disclosure is not limited to piston-cylinder-type actuators. Other types of actuators, such as rotary actuators, come within the scope of this disclosure.

In the illustrated example, the piston 42 acts as a moveable target representative of the position of the actuator 24A. In this example, the actuator position module 32 is electrically coupled to each actuator 24A by way of a cable 54 (represented in FIG. 1 as wired connections $32W_1$-$W_4$), which may be a coaxial cable in some examples. The cable 54 is configured to transmit a wave, such as a microwave, along the cable 54 to a wave guide 56 within the actuator 24A.

The wave guide 56 is arranged to direct waves 58 toward the piston 42. The waves 58 are reflected off of the moveable target 42 and returned to the wave guide 56. The waves 58 are then directed back to the actuator position module 32 by way of the cable 54. The actuator position module 32 is configured to determine the position of the piston 42 based on the delay between generation and return of the waves 58. While cables 54 and wave guides 56 are illustrated, it should be understood that the position of the actuators 24A-24N may be monitored using other techniques.

The actuator position module 32 is configured to relay actuator position information to the actuator control unit 28, which is in turn configured to send this information to the EEC 22. The EEC 22 is programmed to send corresponding instructions back to the actuator control unit 28 based on the recorded position of the actuators 24A-24N, among other variables.

As shown in FIG. 2, each of the actuators may include a motor 46. The drive module 34 is configured to provide commands to each of the motors 46 associated with each actuator 24A-24N to adjust the operating conditions of the motors 46. Example instructions include the speed, rotational position, and rotational direction of the motor. The drive module 34 is further configured to receive feedback from each of the motors 46 to monitor their operating status, and to report the same to the actuator control unit 28. The drive module 34 is further configured to use the motor's rotational position for motor commutation.

Since the actuators 24A-24N are in direct communication with the central control unit 26, there is no need for each actuator 24A-24N to include its own control unit or its own individual control modules, such as a power conditioning module, an actuator position module (which may or may not have included an LVDT), or a drive module. Instead, the actuators 24A-24N essentially "share" the common modules provided in the central control unit 26. The various commands and feedback are multiplexed sequentially, in parallel or a combination, in each of these modules 30, 32, 34, to each of the plurality of actuators 24A-24N. This reduces the complexity, cost, and weight associated with each of the actuators 24A-24N. This further leads to significant reduction in weight in the gas turbine engine, as well as simplifying the overall construction and ease of manufacturing the actuators 24A-24N.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A system for controlling actuators within a gas turbine engine, comprising:
   an electronic engine controller;
   a plurality of actuators; and
   a central control unit, wherein the central control unit includes an actuator control unit electrically coupled to the electronic engine controller and a plurality of actuator control modules, each of the actuator control modules electrically coupled to each of the plurality of actuators, wherein the plurality of actuator control modules include a power conditioning module, an actuator position module, and a drive module.

2. The system as recited in claim 1, further comprising an electrical bus, wherein each of the actuator control modules is electrically coupled to each of the plurality of actuators by way of the electrical bus.

3. The system as recited in claim 1, wherein the power conditioning module includes a power conditioner electrically coupled to at least one electrical power source and configured to deliver electrical power to each of the plurality of actuators.

4. The system as recited in claim 1, wherein each of the plurality of actuators includes a wave guide adjacent a moveable target, and wherein the actuator position module generates a wave signal and directs the wave signal to the wave guide of at least one of the actuators, the wave guide configured to direct the wave signal toward the moveable target and direct a return wave signal reflected off of the moveable target to the actuator position module, the actuator position module configured to interpret the return wave signal as a position of the moveable target.

5. The system as recited in claim 4, wherein the moveable target is a piston.

6. The system as recited in claim 1, wherein each of the plurality of actuators includes a motor, and wherein the drive module is configured to provide commands to each of the motors to adjust operating conditions of the motor.

7. The system as recited in claim 1, wherein each of the actuators is associated with a different assembly within the engine.

8. The system as recited in claim 7, wherein at least one of the actuators is configured to rotate a stator vane assembly, at least one of the actuators is configured to adjust a position of a variable area nozzle, and at least one of the other actuators is configured to adjust a bleed valve position.

9. The system as recited in claim 1, wherein each of the actuator control modules provides a set of common control modules for each of the plurality of actuators.

10. A method for controlling actuators within a gas turbine engine, comprising:
   providing instructions from an electronic engine controller to a central control unit, the instructions relating to operating conditions of a plurality of actuators;
   interpreting the instructions from the electronic engine controller with an actuator control unit of the central control unit;
   providing commands from the actuator control unit to at least one of a plurality of actuator control modules of the central control unit, each of the actuator control modules electrically coupled to each of the plurality of actuators, wherein the plurality of actuator control modules include a power conditioning module, an actuator position module, and a drive module.

11. The method as recited in claim 10, wherein one of the actuator control modules is a power conditioning module having a power conditioner electrically coupled to at least one electrical power source, the power conditioning module delivering electrical power to each of the plurality of actuators in response to the commands from the actuator control unit.

12. The method as recited in claim 10, wherein each of the plurality of actuators includes a wave guide adjacent a moveable target, and wherein the one of the actuator control modules includes an actuator position module.

13. The method as recited in claim 12, further comprising:
   generating a wave signal with the actuator position module in response to the commands from the actuator control unit;
   directing the wave signal to the wave guide of at least one of the actuators, the wave guide directing the wave signal toward the moveable target and directing a return wave signal reflected off of the moveable element to the actuator position module; and
   interpreting, using the actuator position module, the return wave signal to determine a position of the moveable target.

14. The method as recited in claim 10, wherein each of the plurality of actuators includes a motor, and wherein one of the actuator control modules is the drive module providing commands, in response to the commands from the actuator control unit, to each of the motors to adjust operating conditions of the motor.

15. The method as recited in claim 10, wherein each of the actuators is associated with a different assembly within the engine.

16. The method as recited in claim 10, wherein each of the actuator control modules provides a set of common control modules for each of the plurality of actuators.

* * * * *